Patented Oct. 26, 1937

2,097,224

UNITED STATES PATENT OFFICE

2,097,224

STABILIZING CHOCOLATE MILK AND OTHER MILK PRODUCTS AND PROCESS OF MAKING SAME

Harland C. Green, Donald E. Clark, and Raymond P. Mann, San Diego, and Bennett Preble, National City, Calif., assignors to Kelco Company, Los Angeles, Calif., a corporation of Delaware No Drawing. Application November 11, 1935, Serial No. 49,320. Renewed June 3, 1937

18 Claims. (Cl. 99—25)

This invention is an improvement in manufactured chocolate milk drinks and the process of making same and the object of the invention is to provide a light bodied, refreshing suspended chocolate milk drink which requires no holding after cooling and which will not mottle, develop a cream line or settle, but will remain homogeneous even when several days old and exposed to temperature fluctuations.

Heretofore manufactured chocolate milk drinks made in quantities for commercial purposes have usually been stabilized either with alginate, vegetable gums, gelatine, or with starches. Such drinks have not been entirely successful for the following reasons:

Chocolate milk drinks stabilized with alginates require that the milk be held for about one hour after cooling and before bottling, otherwise a mottled appearance usually appears in the bottle after one or two days standing. By mottling we mean whitish streaks or splotches in the chocolate drink which gives the impression that the milk has soured although such is not necessarily the case. Sometimes this mottled appearance appears even when the drink is held for about an hour before bottling if the temperature of the bottled drink fluctuates even a few degrees. Many dairies do not have facilities for holding the drink before bottling and many do not have facilities for maintaining a constant temperature of the bottled product until it is finally sold.

Drinks prepared with gums such as Irish moss, Locust bean gum and Karaya in combination with each other or separately do not give an entirely satisfactory product.

When Irish Moss is used by itself in sufficient amount to give complete suspension of the cocoa fiber, the chocolate milk forms a gel which is noticeable when the milk is poured out and gives a disagreeable impression to the consumer. Irish moss unless specially treated also gives an objectionable characteristic taste to the milk. Locust bean gum used alone not only will not suspend the cocoa in chocolate milk, but also has the property of causing precipitation of the casein.

Combinations of these gums are sometimes used to obscure the more flagrant disadvantages of each and while the result is an improvement, all such mixtures to the best of our knowledge result in a chocolate milk product which does not have a refreshing taste, and which still shows the individual objections of the stabilizers. Some of the chocolate milk drinks made from these mixtures have been known to thicken on standing so that the drink has had to be discarded.

Gelatine when used in sufficient concentration to suspend the cocoa gives a viscous, slimy drink. Chocolate milk when stabilized with starches, such as potato, corn, wheat, tapioca, arrowroot and other starches, combinations of starches with each other or combinations of starches with gums or alginates, all give a starchy taste to the milk. Furthermore most starched drinks require heating up to 190° F. in order to gelatinize the starch product. This high temperature is not only expensive to obtain in a dairy where equipment is usually built for lower temperatures, but also gives an objectionable taste to milk as is well known.

We have discovered that the use of an alginate product when combined in a dry state with a dry Irish moss with cocoa and a sweetening agent and added to milk produces a superior chocolate milk drink having none of the above named objections found with chocolate milk drinks containing either of these two stabilizing agents when used alone or in conjunction with the other above mentioned stabilizers or when the other above mentioned stabilizers are used alone or in conjunction with each other.

The alginate used may be made in accordance with methods disclosed in the application of Harland C. Green, Serial No. 721,829, filed April 21, 1934; Howard J. Lucas, Serial No. 733,530 filed July 2, 1934 and Donald E. Clark and Harland C. Green, Serial No. 4,412, filed January 21, 1935. Such an alginate consists of approximately 55–60% sodium alginate, 5% trisodium phosphate or the equivalent and the balance being sugar and dextrine. Such an alginate is directly milk soluble due to the presence of the trisodium phosphate or its equivalent; and the sugar and dextrine enable it to dissolve more readily in water or in milk.

The Irish moss is prepared by taking some commercial bleached Irish moss and cooking it in water to give approximately a two percent solution and then filtering or otherwise separating the insoluble portion from the soluble portion, and drying by any of several well known drying methods such as drum drying, sun drying, spray drying, etc.

One method of preparation of the chocolate milk drink is with the following approximate formula which will give about 100 gallons of product:

| | | |
|---|---|---|
| Alginate | pounds | .8 |
| Irish moss | do | .7 |
| Sugar | do | 44.0 |
| Cocoa | do | 8.8 |
| Milk with 2% butterfat | gallons | 96 |

The alginate, Irish moss, sugar and cocoa are mixed dry and added to the milk when it reaches a temperature of 160° F. The mixture is stirred at this temperature for 20 to 30 minutes (usually in a pasteurizing vat) and then cooled to 40°–50° F. and bottled. The drink may then be delivered to customers, retail stores or held for such delivery at a later time.

This resulting chocolate milk drink does not set to a gel nor does it mottle. It remains suspended and does not settle or develop a cream line even when subjected to temperature fluctuations normally found in the dairy trade. It has a rich refreshing taste when consumed and leaves no disagreeable after taste or film in the mouth. These characteristics result in customers ordering this type of chocolate milk drink regularly week after week rather than as a curiosity to be consumed for a day or two only as usually occurs when the taste of the drink remains too long in the mouth. The improvement of the aforesaid combination of said alginate and Irish moss therefore has the following practical advantages over the use of gelatine, starch, alginates, or gums since it provides for the chocolate milk:

(1) A light bodied drink which will keep the cocoa fiber suspended in the milk indefinitely. Starch or gelatine drinks do not keep this cocoa suspended indefinitely unless made to a very heavily bodied drink.

(2) No disagreeable after taste in the mouth. Due to the light body of this drink there is no film of stabilizer remaining in the mouth after drinking this product. Starch and gelatine drinks leave such a film in the mouth.

(3) A drink which may be bottled directly after cooling and will show no mottling even when stored under fluctuating temperature conditions. Alginate drinks require a holding period between cooling and bottling and in spite of this often develop a mottled appearance, particularly during summer weather when milk on delivery wagons becomes heated and is then returned to cold room temperatures for future delivery.

(4) A refreshing taste in which the stabilizer taste is not appreciably discernible. It is not necessary to blank out the stabilizer taste with the use of a lot of flavoring such as vanilla. Irish moss and gums when used by themselves or in conjunction with each other have a distinct characteristic taste which has prevented continued use of chocolate milk drinks when so stabilized. When drinks are stabilized with alginate only no such off taste is noted and it is the combination of the alginate drink, which does not give this taste, with the Irish moss drink which enables us to obtain a product having the fresh taste as found in alginate drinks and the absence of mottling as found in Irish moss drinks, which renders our product novel.

(5) A non critical procedure. When alginate is used alone as a stabilizer the drink is critical and if a slight excess of the stabilizer is used the cocoa fibers will appear to "lift" and a white layer forms around the bottom of the bottle of chocolate drink. Often mottling also develops. If not enough stabilizer is used the drink will settle. There is very little margin between the minimum and maximum amount of stabilizer and in commercial plants the result is often a partly settled drink or one overstabilized. When Irish moss is used along with alginates we have found that for some reason this critical condition is eliminated and considerable variation may be had with the concentration of the stabilizers used without noticeably affecting the final product. This is of practical value to dairies.

There are several types of alginates which may be successfully used in conjunction with Irish moss to give this novel chocolate milk drink. We have found that we may use any water soluble, edible alginate product such as ammonium, sodium, potassium alginate and dissolve this alginate directly in water and then add cocoa to this water solution to form an alginate cocoa syrup which may then be added to milk. The Irish moss and sugar may either be added in the syrup or in the milk.

We have found that we may specially prepare the alginate as manufactured by the Clark-Green patent application, Serial #4,412, filed January 21, 1935, by washing the alginic acid as obtained from this application more thoroughly with hydrochloric acid to obtain an alginic acid practically free of even traces of calcium or iron salts, then incorporating this product with ammonia hydroxide, and/or sodium carbonate, sugar and/or dextrine and drying. We have found that this product is soluble at 145° in milk and may be used as above.

In place of the bleached, digested, filtered, dried Irish moss product we have found that we can obtain equally as good results by preparing the Irish moss in several different ways. One of these ways is to take the commercial bleached Irish moss and pulverize it so that it passes through 150 or finer mesh so that when this product is added directly to milk or to syrup the particle size of the insoluble constituents of the Irish moss are not conspicuous in the chocolate milk drink.

We have also found that we may take commercial bleached Irish moss, add water to it to make a paste and then grind this paste to a particle size corresponding to 150 or finer mesh in the dry state so that the particles which do not go into solution are not conspicuous in the chocolate milk drink.

Another method is to wash the Irish moss with acidulated water to remove cold water soluble salts, sea shells, etc., then cook in fresh hot water, filter and dry.

We have found that we do not need to limit ourselves to the use of the bleached type of Irish moss but prefer to use this type as it has a more pleasing appearance and slightly less sea taste.

We have also found that the addition of sugar and/or dextrine when added to the Irish moss product before drying aids in dissolving the dried material either in water or milk.

The amount of sugar, cocoa and butter fat may be varied to meet personal tastes. The ratio of alginate to Irish moss may also be varied depending on the types being used and the amount of this blend may vary with the amount of milk, depending on whether a completely suspended drink or partially suspended drink is desired. We have found however, that about .09% of said alginate, .08% of Irish moss by weight to the final drink gives the best results as the drink is perfectly suspended, free from mottling and practically free from the typical moss taste.

The Irish moss may be prepared by cooking commercial "bleached Irish moss" with water, filtering or otherwise removing the insoluble constituents, drying the filtrate or clarified solution by any of well known drying methods.

We claim:—

1. A chocolate milk drink containing milk, cocoa, a sweetening agent and a water soluble alginate compound and Irish moss.

2. A chocolate milk drink containing milk, cocoa, a sweetening agent and a milk soluble alginate compound and Irish moss.

3. A chocolate milk drink containing milk, cocoa, sugar, an alginate compound including phosphate to render it milk soluble and Irish moss.

4. A chocolate milk drink containing a stabilizing mixture comprising sodium alginate, trisodium phosphate, a sweetening agent and Irish moss.

5. A chocolate milk mixture containing a stabilizing mixture comprising a high viscosity sodium alginate, trisodium phosphate, a sweetening agent and Irish moss.

6. A chocolate milk mixture containing a stabilizing mixture comprising about 20–25% high viscosity sodium alginate, about 2% trisodium phosphate, about 20–30% a sweetening agent and 50% Irish moss.

7. A chocolate milk mixture containing about 2% by weight of stabilizer consisting of 20–25% high viscosity sodium alginate, about 2% trisodium phosphate, about 20–30% a sweetening agent and 50% Irish moss.

8. The process of manufacturing a chocolate milk drink comprising the step of adding to milk during pasteurization cocoa, sugar and a stabilizing mixture of a water and milk soluble alginate compound and a water and milk soluble Irish moss compound, and cooling the mixture.

9. The process of manufacturing a chocolate milk drink comprising the step of adding an edible soluble alginate compound to water, heating, then adding cocoa, sugar and a water soluble Irish moss compound, then adding this syrup to milk during pasteurization, and cooling.

10. The process of manfacturing chocolate milk drink comprising the step of adding a milk soluble alginate compound, Irish moss, cocoa and sugar to milk at 160° and cooling.

11. A chocolate milk drink containing as stabilizing ingredients finely dispersed milk soluble Irish moss and an edible soluble alginate compound.

12. A chocolate milk drink containing a stabilizing mixture of an edible soluble alginate compound and a solution of finely ground Irish moss.

13. A chocolate milk drink containing a stabilizing mixture of an edible soluble alginate compound and a solution of an Irish moss compound ground to a fineness rendering insoluble constituents of the moss inconspicuous.

14. The process of manufacturing a stabilizing mixture for chocolate milk; consisting in grinding a paste of Irish moss to such fineness as will render any insoluble constituents of the moss inconspicuous, and mixing an edible soluble alginate compound therewith.

15. The process of manufacturing a stabilizing mixture for chocolate milk; consisting in washing Irish moss with acidulated water, boiling it with water, filtering, drying the filtered moss and grinding the dried moss; and mixing the ground moss with an edible soluble alginate compound.

16. A chocolate milk drink, containing a stabilizing mixture of an edible soluble alginate compound and a solution of filtered Irish moss.

17. The process of manufacturing a stabilizing mixture for chocolate milk, consisting in mixing an edible soluble alginate compound with a solution of filtered and dried Irish moss.

18. The process of manufacturing a stabilizing mixture for chocolate milk; consisting in boiling Irish moss, filtering it, and drying the filtered moss; and finally mixing it with an edible soluble alginate compound.

HARLAND C. GREEN.
DONALD E. CLARK.
RAYMOND P. MANN.
BENNETT PREBLE.